United States Patent
Sherafat Kazemzadeh et al.

(10) Patent No.: US 11,366,744 B2
(45) Date of Patent: Jun. 21, 2022

(54) PARTITIONING AND ORCHESTRATING INFRASTRUCTURE SOFTWARE DEPLOYMENTS FOR SAFETY AND AGILITY ACROSS DIVERSE CONFIGURATIONS AND HARDWARE TYPES

(71) Applicant: Microsoft Technology Licensing, LLC, Redmond, WA (US)

(72) Inventors: Reza Sherafat Kazemzadeh, Seattle, WA (US); Harsh Gupta, Redmond, WA (US); Binit R. Mishra, Seattle, WA (US); Yevgeniy Olegovich Razuvayev, Redmond, WA (US); Muhammad Usman Sharif, Bothell, WA (US); Li-Fen Wu, Seattle, WA (US); Cristina del Amo Casado, Seattle, WA (US); Avnish Kumar Chhabra, Redmond, WA (US); Hariharan Jayaraman, Sammamish, WA (US); Li Xiong, Redmond, WA (US); Abhishek Singh, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 641 days.

(21) Appl. No.: 15/720,066

(22) Filed: Sep. 29, 2017

(65) Prior Publication Data

US 2018/0293152 A1 Oct. 11, 2018

Related U.S. Application Data

(60) Provisional application No. 62/483,143, filed on Apr. 7, 2017.

(51) Int. Cl.
*G06F 9/44* (2018.01)
*G06F 11/36* (2006.01)
(Continued)

(52) U.S. Cl.
CPC ........ *G06F 11/368* (2013.01); *G06F 9/45558* (2013.01); *G06F 11/3688* (2013.01);
(Continued)

(58) Field of Classification Search
CPC ....................................................... G06F 8/65
See application file for complete search history.

(56) References Cited

U.S. PATENT DOCUMENTS 7,334,005 B2 2/2008 Sobel
9,141,522 B1 * 9/2015 Zias .................... G06F 11/3688
(Continued)

OTHER PUBLICATIONS

Microsoft, "Planning the Development, Testing, Staging, and Production Environments", retrieved from <https://web.archive.org/web/20130326202206/http:/msdn.microsoft.com:80/en-US/library/cc296714(v=bts.10).aspx> on May 12, 2017, 4 pages.
(Continued)

*Primary Examiner* — Chat C Do
*Assistant Examiner* — Lenin Paulino
(74) *Attorney, Agent, or Firm* — Fiala & Weaver P.L.L.C.

(57) ABSTRACT

Systems, methods and computer program products are described herein that can be used to help achieve a safe rollout of software in a production datacenter environment. In accordance with certain embodiments, cloud services requests from certain users of a cloud services system (e.g., users that are authorized to receive cloud services via computing devices running test versions of infrastructure software) are dynamically matched to clusters (groups of commonly-managed computing devices called nodes) that are capable of providing the requested services on nodes
(Continued)

running test versions of infrastructure software. Within such clusters, the requested services are provided to the users on a subset of cluster nodes that run a test version of an infrastructure software component, while the remaining cluster nodes are not running the particular test version.

20 Claims, 7 Drawing Sheets

(51) Int. Cl.
| | |
|---|---|
| *H04L 67/63* | (2022.01) |
| *G06F 9/455* | (2018.01) |
| *H04L 67/10* | (2022.01) |
| *H04L 67/00* | (2022.01) |
| *H04L 41/0893* | (2022.01) |
| *G06F 8/60* | (2018.01) |

(52) U.S. Cl.
CPC .......... *H04L 41/0893* (2013.01); *H04L 67/10* (2013.01); *H04L 67/327* (2013.01); *H04L 67/34* (2013.01); *G06F 8/60* (2013.01); *G06F 2009/4557* (2013.01); *G06F 2009/45587* (2013.01); *G06F 2009/45591* (2013.01)

(56) References Cited

U.S. PATENT DOCUMENTS

| | | | |
|---|---|---|---|
| 9,338,064 | B2 | 5/2016 | Stratton et al. |
| 2004/0060044 | A1 | 3/2004 | Das et al. |
| 2006/0248116 | A1 | 11/2006 | Sobel |
| 2010/0257513 | A1 | 10/2010 | Thirumalai et al. |
| 2014/0040174 | A1* | 2/2014 | Leung ................. G06F 11/0751 706/12 |
| 2015/0178064 | A1 | 6/2015 | Cairns et al. |
| 2017/0171191 | A1* | 6/2017 | Cignetti ................. H04L 63/06 |
| 2018/0253373 | A1* | 9/2018 | Mathur ............... G06F 11/3688 |
| 2019/0065165 | A1* | 2/2019 | Troutman ............... H04L 67/34 |

OTHER PUBLICATIONS

Wilson, Neil, "Pre-Production Testing—Using Production Data to Test Your New Applications and Services", retrieved from <https://www.unboundid.com/blog/2012/10/24/pre-production-testing-using-production-data-to-test-your-new-applications-and->, Published on: Oct. 24, 2012, 5 pages.

* cited by examiner

PARTITIONING AND ORCHESTRATING INFRASTRUCTURE SOFTWARE DEPLOYMENTS FOR SAFETY AND AGILITY ACROSS DIVERSE CONFIGURATIONS AND HARDWARE TYPES

CROSS-REFERENCE TO RELATED APPLICATIONS

This application claims priority to U.S. Provisional Patent Application No. 62/483,143, filed Apr. 7, 2017, the entirety of which is incorporated by reference herein.

BACKGROUND

Ensuring the safe rollout of infrastructure software in a production datacenter (i.e., a facility of a cloud service provider used to house computing devices used for remote storage and processing) environment can be complicated. This is because the test infrastructure in which the changes to the infrastructure software are tested may not fully cover the hardware diversity and environmental conditions that exist in production environments. For example, heterogeneity (i.e., a variety in software/hardware configurations and settings in production environments in use across datacenters) makes it challenging to ensure the safe rollout of infrastructure software. Moreover, the impact a version of infrastructure software may have (e.g., in terms of performance) on various cloud service user workloads running in a datacenter may be difficult to anticipate. The details of such user workloads may be unknown to the cloud service provider, thus preventing the cloud service provider from validating compatibility of a rollout of infrastructure software without the input of the cloud service user. Consequently, rollout of infrastructure software is often considered risky as it may impact the healthy operation of the datacenter as a whole and the user workloads deployed to the datacenter.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Methods, systems, apparatuses, and computer program products are described herein that improve the safe rollout of infrastructure software in a production datacenter environment.

Systems, methods and computer program products are described herein that can be used to help achieve a safe rollout of software in a production datacenter environment. In accordance with certain embodiments, cloud services requests from certain users of a cloud services system (e.g., users that are authorized to receive cloud services via computing devices running test versions of infrastructure software) are dynamically matched to clusters (groups of commonly-managed computing devices called nodes in a datacenter) that are capable of providing the requested services on nodes running test versions of infrastructure software that need to be validated. Within such clusters, the requested services are provided to the users on a subset of cluster nodes that run a test version of an infrastructure software component, while the remaining cluster nodes do not run the particular test version.

This approach to rolling out changes to infrastructure software can provide many benefits, including but not limited to: any problems with a test version of infrastructure software may be limited to only a subset of nodes within a cluster, and may not impact the entire cluster; the fidelity and coverage of the validation process may increase as each (and, if so desired, every) production cluster provides a subset of nodes within a cluster which includes the datacenter's specific software configuration and hardware type that can be validated; the elective participation of users of the cloud services system, ensuring that the potential impact of bugs is limited to those users only; different node subsets within production datacenter clusters can be allocated to different development teams, so that each development team can validate their infrastructure software changes independently, in parallel, and in isolation; and highly critical software updates are not blocked by the validation that is in progress in each production cluster.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiment and to enable a person skilled in the relevant art(s) to make and use the embodiments.

Figure 1:
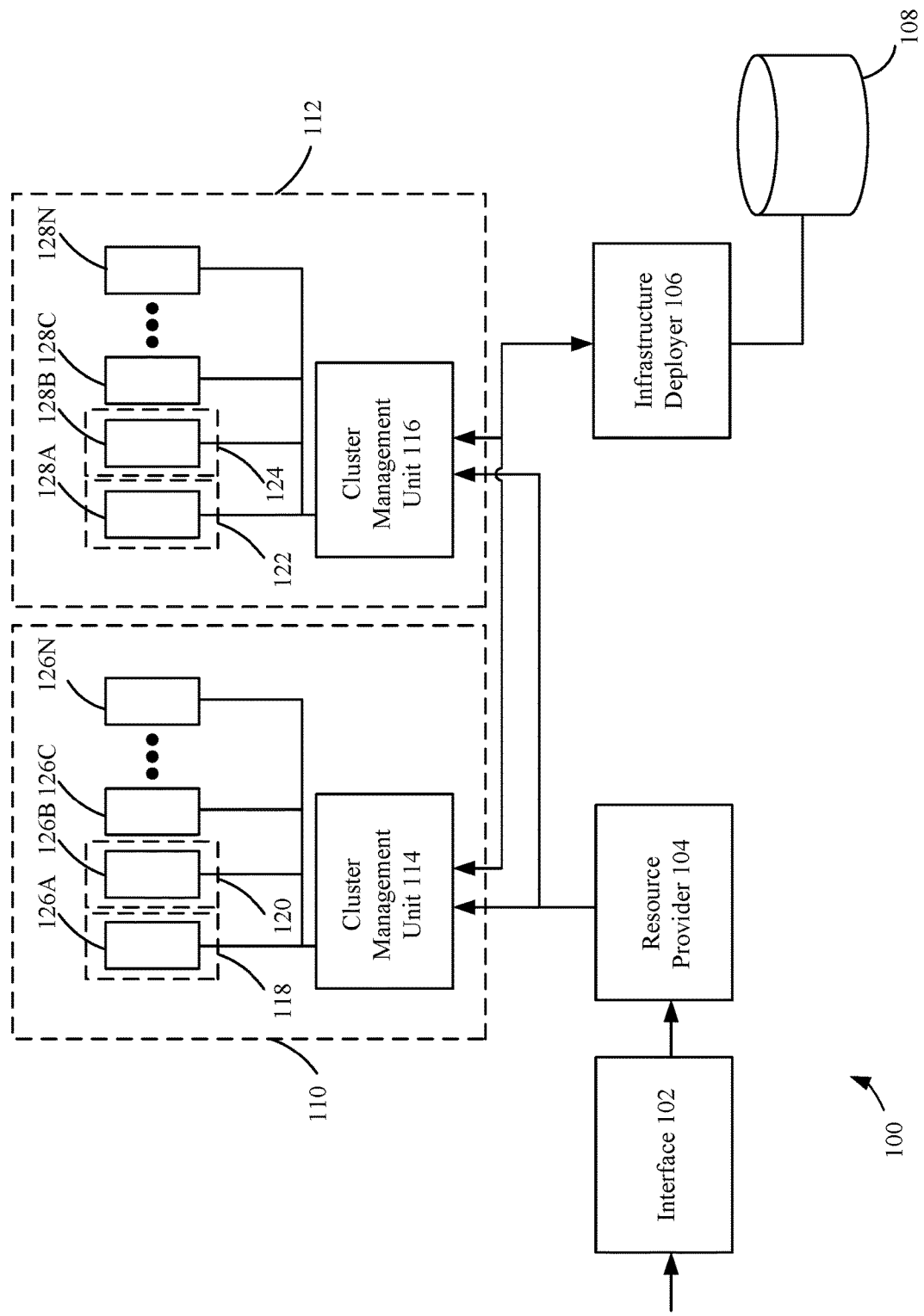
FIG. 1 is a block diagram of a cloud services system that partitions and orchestrates infrastructure software deployments to help achieve a safe rollout of infrastructure software, in accordance with an embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

In the discussion, unless otherwise stated, adjectives such as "substantially" and "about" modifying a condition or relationship characteristic of a feature or features of an embodiment of the disclosure, are understood to mean that the condition or characteristic is defined to within tolerances that are acceptable for operation of the embodiment for an application for which it is intended.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Embodiments

Example embodiments described herein are directed to techniques that can be used to help achieve a safe rollout of infrastructure software in a cloud services system, such as in a production datacenter environment of a cloud services system.

In some conventional cloud services system implementations, infrastructure software rollouts are deployed to production datacenters in stages. For example, clusters may be ordered in terms of their regional significance, their hardware/software configuration, or the types of customer workloads deployed on the cluster. Buggy or malfunctioning infrastructure software that is not identified in the early stages of a rollout may be detected only after impacting large swaths of production machines. This can be disruptive to the operation of the cluster and user workloads, degrade user perceived reliability of the cloud service, and potentially violate the Service Level Agreement ("SLA") of the cloud service provider. Furthermore, late detection of bugs in an infrastructure software rollout may create delays in full deployment of infrastructure software across all production datacenters. For example, when a bug is detected, a hotfix rollout may be needed to address the bug. At times, the hotfix process may need to be repeated multiple times to fix the bugs that are discovered at different stages of the rollout. Until all bugs are fixed, infrastructure software cannot be rolled out successfully to the entire production datacenter.

Heterogeneity (i.e., a divergence in software/hardware configurations and settings in production environments in use across datacenters) also makes it difficult to ensure the safe rollout of infrastructure software across all different software/hardware configurations and settings in production datacenters using the staged approach. For instance, a divergence in software configurations or a difference in hardware types (e.g., having different specifications or different manufacturers/vendors) deployed in each datacenter increases the number of validation steps needed. As a result, prior validation of all software configurations and hardware types in a test environment with identical setups is often impractical and effort- and cost-intensive. In addition, the difference in the types of customer workloads in each datacenter adds an additional layer of diversity, which may be unknown to the cloud provider and is also hard and impractical to validate against in a test environment.

Moreover, the impact a version of infrastructure software may have (e.g., in terms of correctness of operation or performance) on various user workloads running in a datacenter may be difficult to detect by the cloud service provider alone. Such workloads may be unknown to the cloud services provider, thus preventing the cloud services provider from validating compatibility of a given version of infrastructure software without the input of the cloud services user. Consequently, rollout of infrastructure software is often considered risky as it may impact the healthy operation of the datacenter as a whole and the user workloads deployed to the datacenter. For example, users may see degradation of their quality of service and perceive a lower performance, availability and reliability of the cloud services provided.

Embodiments described herein address one or more of the above-mentioned issues by providing small-scale, well-isolated slices of production clusters (wherein each cluster comprises one or more nodes, wherein a node may comprise a computing device, machine, or other type of hardware such as a field-programmable gate arrays (FPGA), graphic processing unit (GPUs), or the like) which can be updated individually and in parallel and can be occupied by users electing to participate in the validation process. In this case, a slice includes some nodes of a particular cluster, but not all of the nodes in the particular cluster.

One advantage provided by embodiments described herein is that a problem with a test version of infrastructure software may be contained to only a subset of nodes within a cluster, and may not impact the entire cluster. As used herein, the term "test version" is intended to broadly encompass any version of a software component that is being tested, evaluated, observed, monitored or otherwise considered for deployment on one or more computing devices. The term "test version" can thus encompass versions under development, candidate versions being considered for deployment, or the like. Another advantage provided by embodiments described herein is an increase in the safety of rollouts of test versions of infrastructure software by ensuring that issues therewith are discovered early on during such rollout and by reducing the impact on other customer workloads. Yet another advantage provided by embodiments described herein is that the fidelity and coverage of the validation process may increase as each (and, if so desired, every) production datacenter provides one or more slices which includes the datacenter's specific software configuration and hardware type that can be validated. A further advantage provided by embodiments described herein includes the elected participation of users of the cloud services system to acquire resources that reside on the nodes running test version of infrastructure software, ensuring that the potential impact of bugs is limited to those users only and does not impact other non-participating users. As such, users understand that by electing to deploy their workloads on slices running test versions of infrastructure software that their workloads are subject to higher levels of risks of degradation.

Still other advantages provided by embodiments described herein include but are by no means limited to: different slices of production datacenters can be allocated to different development teams, so that each development team can validate their infrastructure software changes independently, in parallel, and in isolation; highly critical software updates needed to be delivered urgently to nodes are not blocked by the validation that is in progress in each production cluster; an ability to perform validations of different combinations of test versions of infrastructure software in parallel on different slices in each cluster and across different clusters; an ability to ensure risks associated with test versions of infrastructure software is limited to scoped sets of nodes where only users elected to have their resources deployed reside; an ability to schedule a specific order in which the test version of the infrastructure software component is rolled out across subsets of nodes and across clusters, based on one or more of health information retrieved from the subsets of nodes and feedback from users receiving requested resources via the subsets of nodes; and an ability to schedule broad rollout of the test version of the infrastructure software component when the test version is promoted as fully ready for broad rollout.

The following describes methods, systems, apparatuses, and computer program products that partition and orchestrate infrastructure software deployments to help achieve a safe rollout of infrastructure software in a production datacenter environment.

To help illustrate the foregoing, FIG. 1 will now be described. In particular, FIG. 1 is a block diagram of an example cloud services system 100 that partitions and orchestrates infrastructure software deployments to help achieve a safe rollout of infrastructure software, in accordance with an embodiment. As shown in FIG. 1, cloud services system 100 includes an interface 102, a resource provider 104, an infrastructure deployer 106, a repository 108, a first cluster 110, and a second cluster 112. Although only two clusters are shown in FIG. 1, it is to be understood that cloud services system 100 may include any number of clusters, with similar or varying capabilities, software or hardware configurations. As used herein, the term "cluster" generally refers to a plurality of commonly-managed computing devices inside a datacenter, wherein each computing device may be referred to as a "node." Each cluster may be isolated from each other cluster in the sense that the clusters do not share resources or otherwise operationally depend upon each other, such that operational problems with one cluster will not impact the others. In an embodiment, first cluster 110 and second cluster 112 may comprise clusters within a same datacenter of cloud services system 100, while in another embodiment, first cluster 110 and second cluster 112 comprise clusters within different datacenters, respectively. Each of the foregoing components of cloud services system 100 will now be described.

Cluster 110 comprises a cluster management unit 114 that manages each of a plurality of nodes 126A, 126B, 126C, . . . 126N. Cluster management unit 114 may comprise software executing on one or more computing devices. For example, cluster management unit 114 may comprise software executing on one or more of nodes 126A-126N, or on one or more other computing devices connected thereto. Among other features, cluster management unit 114 is configured to logically partition plurality of nodes 124A-124N into multiple distinct subsets of nodes, wherein each subset of nodes may be referred to herein as a "slice". For example, cluster management unit 114 may partition plurality of nodes 126A-126N into a first slice 118 that includes node 126A and a second slice 120 that includes node 126B, although this is merely an example and is not intended to be limiting. It is to be understood that each slice may include any number of nodes, provided that the nodes belong to the cluster and that the number of nodes in the slice is less than all of the nodes in the cluster. Cluster management unit 114 is also configured to cause each node within a particular slice (e.g., first slice 118, second slice 120) to run a test version of an infrastructure software component. In an embodiment, a test version of an infrastructure software component running on first slice 118 may not be executed on any other nodes within cluster 110. In another example, another test version of another infrastructure software component may be executed on nodes of second slice 120 and not executed on nodes of first slice 118.

As used herein, the term "infrastructure software" generally refers to any software component (i.e., computer program) that may be used by a cloud services provider to support the delivery of cloud services via nodes. For example, infrastructure software may include software components that enable a cloud services provider to host virtual machines and workloads on a node. Infrastructure software may include, for example, software components that manage virtual machines or that operate to help maintain and update an operating system of a node.

As further shown in FIG. 1, cluster 112 includes a cluster management unit 116 that manages each of a plurality of nodes 128A, 128B, 128C, . . . 128N. Like cluster management unit 114, cluster management unit 116 may comprise software executing on one or more computing devices. For example, cluster management unit 116 may comprise software executing on one or more of nodes 128A-128N, or on one or more other computing devices connected thereto. Among other features, cluster management unit 116 is configured to logically partition plurality of nodes 128A-128N into a first slice 122 that includes node 128A and a second slice 124 that includes node 128B, although as noted above a slice may include any number of nodes, provided that the nodes belong to the cluster and that the number of nodes in the slice is less than all of the nodes in the cluster. Cluster management unit 114 is also configured to cause each node within a particular slice (e.g., first slice 122, second slice 124) to run a test version of an infrastructure software component that is not being executed on any other nodes within the same cluster. In an embodiment, first slice 122 is non-overlapping with respect to second slice 124, and the test version of an infrastructure software component that is running on nodes of slice 122 is not being run on nodes of second slice 124.

In certain embodiments, each cluster management unit 114, 116 is capable of reassigning a node from one slice to another slice based, for example, on a type of user workload running on the node. Furthermore, each cluster management unit 114, 116 may allow a slice to include a variable number of nodes, although the total number of nodes in a given slice may be capped to ensure it does not exceed a desired limit. In addition, each cluster management unit 114, 116 may utilize a slice to accommodate first-party users (e.g., users affiliated with the provider of cloud services system 100) and/or third-party users (e.g., customers who are authorized to receive cloud services via nodes running test versions of infrastructure software).

Additionally, in an embodiment, each slice may be identified using one or more aliases. The alias may identify a single slice within a particular cluster or one or more slices among a group of clusters which are used to run a test version of infrastructure software component. Users may use the alias to indicate a preference to have requested resources allocated on nodes in a slice or slices that are identified by the alias. The alias may be omitted from a user request if the alias is implied by other factors in the user request or if a default slice is used for all user requests.

Interface 102 comprises software executing on one or more computing devices that is configured to receive from a user a request for resources of cloud services system 100. The resources that are requested may include, for example, one or more physical computing devices or virtual machines running on physical computing devices. Such resource(s) may be requested by the user to support the delivery of various types of service offerings of cloud services system 100, including but not limited to Infrastructure-as-a-Service (IaaS), Platform-as-a-Service (PaaS), or Software-as-a-Service (SaaS) type service offerings. Interface 102 may comprise any type of user interface suitable for receiving such requests, including but not limited to a Web portal, a command line interface, a graphical user interface, or the like. Interface 102 may also comprise an application programming interface (API) in a case in which the request is received via another computer program. The user submitting the request may comprise a first-party user or a third-party user of cloud services system 100. The use of interface 102 for submitting such requests may be regulated according to certain policies adopted by the cloud service provider. For example, such policies may restrict the usage to only groups of users who are deemed fit or may place restrictions on which clusters or slice aliases a given user (or group of users) can requests resources in. Additionally, as further examples of such policies, the cloud service provider may place a fee on resources assigned to users, restrict the maximum number of resources that can be requested per user, per groups of users, or per resource type, or prohibit resource request submissions for various groups of users.

Interface 102 is further configured to send the received request to a resource provider 104. Resource provider 104 comprises software that is executing on one or more computing devices. Resource provider 104 is configured to select, for a given resource request, a cluster that is suitable for servicing the request and to dispatch the request to a cluster manager unit associated with the selected cluster. If proper processing of the request requires engagement of other entities outside of the (physical or logical) boundaries of the selected cluster, those entities are also contacted by resource provider 104 as needed. For example, creation of virtual machines resources on nodes in a cluster may require allocation and configuration of network resources to enable proper communications with those virtual machines. Such allocation and configuration may be serviced by entities or applied to entities that physically or logically reside outside the cluster In the embodiment shown in FIG. 1, resource provider 104 is configured to determine whether or not the user that submitted the request is a user that is authorized to receive cloud services via nodes running test versions of infrastructure software. For the sake of brevity, such a user will be referred to herein as an "eligible user." Resource provider 104 may determine that the user is an eligible user based on information included in the request itself, by determining that the user is included in a registry of eligible users, or via some other means. Further, the request submitted by the user may include user preferences which may influence which cluster(s) can be selected by resource provider 104. For example, such preferences may include a geographical location of a desired resource or a desired type of hardware or software capability. The request submitted by the user may also specify a slice alias that ensures that resource provider 104 dispatches the request to clusters with slices identified by the alias.

If resource provider 104 determines that the user that submitted the request is an eligible user, then resource provider 104 will select a cluster that is capable of providing the requested resources via a slice that can run test versions of infrastructure software, and will dispatch the request to a cluster management unit associated with the selected cluster. For example, after determining that the user that submitted the request is an eligible user, resource provider 104 may select cluster 110 to provide the resources based on a determination that cluster 110 is capable of providing the requested resources via a slice (e.g., slice 118 or slice 120) that can run a test version of infrastructure software that is not being run on every node within cluster 110 (but note that the test version of infrastructure software may be running on node(s) of another slice within cluster 110). Furthermore, if the request specifies a slice alias, then the selected cluster may include a slice associated with the user-provided alias. As another example, after determining that the user that submitted the request is an eligible user, resource provider 104 may select cluster 112 to provide the resources based on a determination that cluster 112 is capable of providing the requested resources via a slice (e.g., slice 122 or slice 124) that can run a test version of infrastructure software that is not being run on every node within cluster 112 (but note that the test version of infrastructure software may be running on node(s) of another slice within cluster 112). Furthermore, if the request specifies a slice alias, then the selected cluster may include a slice associated with the user-provided alias.

Each of cluster management unit 114 and cluster management unit 116 is configured to receive requests dispatched from resource provider 104 and to service such requests via one or more nodes within their respective cluster. If the requests are for eligible users, then each cluster management unit may service the request via a slice that is running a test version of an infrastructure software component that may not being run on nodes of the cluster that are not within the slice. For example, cluster management unit 114 may provide the requested resources to the user via slice 118 of cluster 120 and to cause node 126A of slice 118 to run a test version of an infrastructure software component that is not being run on nodes 120B-120N that are not within slice 114. For further illustration, cluster management unit 116 may provide the requested resources to the user via slice 122 and cause node 128A of slice 122 to run a test version of an infrastructure software component that is not being run on nodes 122B-122N that are not within slice 122. Furthermore, if the request specifies a slice alias, then the selected slice may be associated with the user-provided alias. In some instances, nodes to which the requested resources will be assigned may be occupied by resources that were previously requested by other users. In that case, both the previous user and the one whose resources are currently being created intend to run the same version of the test infrastructure software. Such shared allocation of resources on the same nodes may be prohibited in the event that the user requests indicate exclusive access to the node (provided that the user is also eligible for such exclusive access).

Cluster management unit 114 and cluster management unit 116 may be further configured to provide the requested resources to the user by using previously-launched nodes within a slice or, if there are not enough previously-launched nodes available within a slice that can satisfy the user request to provide the requested resources, by launching one or more new nodes within the slice and providing the requested resources to the user via the one or more new nodes. In general, processing of future resource requests may create those resources on nodes pre-occupied by resources of existing users only if their intended version of test infrastructure software does not conflict with the version(s) that are already running on those nodes.

In embodiments, each of cluster management unit 114 and cluster management unit 116 are further configured to concurrently run test versions of different infrastructure software components on different slices within their respective clusters (or different test versions of the same infrastructure software component). For example, in response to a first request dispatched from resource provider 104, cluster management unit 114 can provide the resources specified in the first request via node 126A of slice 118 which is running a test version of a first infrastructure software component. In further accordance with this example, in response to a second request dispatched from resource provider 104, cluster management unit 114 can provide the resources specified in the second request via node 126B of slice 120 which is running a test version of a second infrastructure software component. Thus, slice 118 can be used to execute the test version of the first infrastructure software component while slice 120 is used to concurrently execute the test version of the second infrastructure software component. Depending on the number of slices within a particular cluster, any number of different combinations of infrastructure software components may be concurrently tested within the cluster (within the same slice or across different slices). In further embodiments, each of cluster management unit 114 and cluster management unit 116 may be configured to partition the nodes of a slice into smaller groups ("sub-slices") to test (concurrently or serially) multiple different infrastructure software components within a single slice, thereby increasing the parallelism. Furthermore, a cloud service provider may assign aliases to slices that run particular combinations of test versions of infrastructure software to enable users to request resources to be allocated on nodes associated with the alias. Furthermore, each slice can may have a designated alias that can also identify the combination of test versions of infrastructure software components running in that slice.

Infrastructure deployer 106 comprises software that is executing on one or more computing devices and is configured to provide test versions of infrastructure software components to cluster management unit 114 and 116, so that each cluster management unit can deploy the test versions on corresponding slices. In an embodiment, each time a test version of infrastructure software is available, infrastructure deployer 106 may be triggered to provide cluster management units 114 and 116 with the test version of infrastructure software. For example, each test version of the infrastructure software may be stored in a repository 108, and when a particular test version of infrastructure software is available, infrastructure deployer 106 may direct cluster management units 110 and 112 to repository 108 where the particular test version of infrastructure software is stored (e.g., by providing a reference in the form of a link or a memory location to cluster management units 110 and 112).

In an embodiment, cluster 110 and cluster 112 comprise nodes having different hardware and/or software configurations from each other. For example, each cluster may reside in a different datacenter, and each datacenter may have nodes that differ from the other datacenter in terms of hardware or software configuration. In such an embodiment, the same test version of an infrastructure software component can be provided by infrastructure deployer 106 to each cluster for rollout to a given slice within each cluster. In this way, the same test version of an infrastructure software component can be validated against different cluster nodes having different hardware and/or software configurations. In another example, cluster 110 and cluster 112 may have the same hardware or software configuration and the same test version of an infrastructure software component can be provided by infrastructure deployer 106 to each cluster for rollout to a given slice within each cluster. In this way, more test coverage is provided for the test version of an infrastructure software component by having a larger test sample.

In another embodiment, cluster 110 and cluster 112 are regionally paired and used to replicate cloud services for a user. Clusters within the same geography may be regionally grouped to provide for replication of resources (e.g., VM storage) that reduce the likelihood of disruption of cloud services for a user. Regionally-grouped clusters may reside in a same datacenter or different datacenters. Further, a slice of node(s) in one cluster of a regional pair may run a test version of an infrastructure software component, while another slice of node(s) in another cluster of the regional group may not run a test version of the infrastructure software component. To explain this scenario using the example of FIG. 1, assume node 126A of slice 118 of cluster 110 is running a test version of an infrastructure software component, while node 128A of slice 122 of cluster 112 is not running a test version of the infrastructure software component. Cloud services for a user may be replicated on node 126A of cluster 110 and node 128A of cluster 112. In this way, if deployment of a software fix to the test version of infrastructure software running on 126A of slice 118 of cluster 110 is needed, then the cloud services provided to the user will not be adversely impacted because the cloud services are replicated on node 128A of slice 122 of cluster 112 which will not require the software fix.

Figure 2:
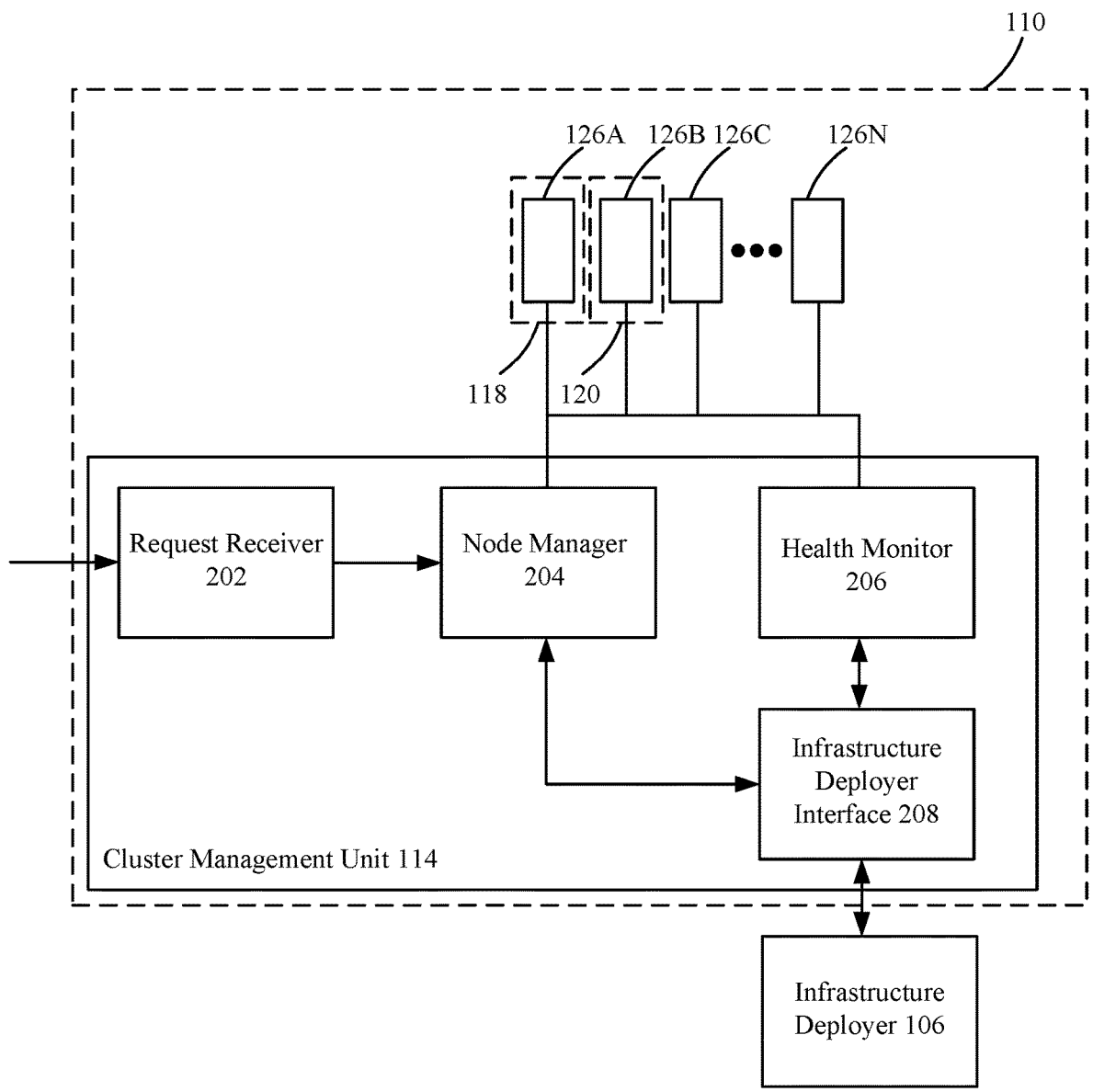
FIG. 2 depicts a block diagram of an example cluster management unit that may be used to implement the system of FIG. 1.

To help further illustrate some of the foregoing concepts, FIG. 2 will now be described. In particular, FIG. 2 is a block diagram that shows one example implementation of cluster management unit 114 of FIG. 1. As shown in FIG. 2, cluster management 114 includes a request receiver 202, a node manager 204, a health monitor 206, and an infrastructure deployer interface 208. As shown in FIG. 2, node manager 204 and health monitor 206 are each communicatively connected to nodes 126A-126N.

Request receiver 202 is configured to receive user requests for resources of a cloud services system. Such requests may be received from an interface, such as interface 102. As noted above, a given request may be associated with a user that is authorized to receive cloud services via nodes running test versions of infrastructure software (referred to herein as "an eligible user").

Node manager 204 is configured to respond to the requests received by request receiver 202 by providing the requested resources to the appropriate users via one or more of nodes within cluster 110. In the case in which the request is associated with an eligible user, node manager 204 is configured to provide the requested resources to the eligible user via a slice with the requested or implied slice alias (e.g., slice 118 or slice 120) and to cause each node within the slice to run a test version of an infrastructure software component that is not being run on nodes of cluster 110 that are not within the relevant slice. For example, node manager 204 may provide the requested resources to the user via slice 118 of cluster 110 and to cause node 126A of slice 118 to run a test version of an infrastructure software component that may not being run on nodes 126B-126B that are not within slice 118. In an embodiment, node manager 204 may also concurrently cause node 126B of slice 120 to run a test version of a different infrastructure software component (or a different test version of the same infrastructure software component), so that two test versions of different infrastructure software components (or two different test versions of the same infrastructure software component) can be concurrently validated within the same cluster in different slices.

Infrastructure deployer interface 208 is configured to receive test versions of infrastructure software components from infrastructure deployer 106. As noted above, in an embodiment, each time a test version of infrastructure software is available, infrastructure deployer 106 may be triggered to provide infrastructure deployer interface 208 with the test version of infrastructure software. After receiving the test version of infrastructure software, infrastructure deployer interface 208 may provide the test version of infrastructure software to node manager 204 for deployment to a particular slice (e.g., slice 118 or slice 120). In the event that no test version of the infrastructure software is provided by infrastructure deployer 106, a default (non-test) version of the infrastructure software may be executed on all nodes of the cluster. Otherwise, the test version of infrastructure software will be upgraded from an earlier version to the new version provided.

Health monitor 206 is configured to obtain data from each of nodes 126A-126N that is indicative of the performance and correct operation of test versions of infrastructure software components that may be executing thereon. For example, such data may indicate that a test version of an infrastructure software component is executing properly or without significant issues. Such data may also indicate that a test version of an infrastructure software component is not executing properly or is causing one or more significant issues. Health monitor 206 is further configured to pass such health information to infrastructure deployer 106 via infrastructure deployer interface 208. Such health information may also include operational and performance information and feedback supplied by users whose workloads run on nodes in slices where a test version of an infrastructure software component executes. User feedback may additionally be collected through a variety of means including direct user engagement (for example via email, user forums, portal and customer support groups) or through additional computer interfaces such as APIs.

Infrastructure deployer 106 may utilize such health information and a rollout status to determine whether or not a test version of an infrastructure software component that is running on a particular slice within cluster 110 (e.g., slice 118 or slice 120) should be rolled out to other nodes within cluster 110 that are not within that slice. For example, if the health information indicates that the test version of the infrastructure software component is running acceptably or without problem within slice 118, then infrastructure deployer 116 may send instructions to node manager 204 via infrastructure deployer interface 208 that instruct node manager 204 to roll out the test version of the infrastructure software component to all nodes within cluster 110. In accordance with further embodiments, if the health information, the rollout status, or the feedback from users indicates that there are problems with the test version of the infrastructure software component, then infrastructure deployer 106 may take various actions including but not limited to: rolling back the test version of the infrastructure software component within the slice in which it is running to a last known safely deployed version, stopping further propagation of the test version of the infrastructure software component to other nodes in cluster 110, and/or stopping further propagation of the test version of the infrastructure software component to other clusters.

In a further embodiment, if the test version of the infrastructure software component is rolled out to all nodes within cluster 110 and health monitor 206 provides health information to infrastructure deployer 106 that indicates that the test version is running acceptably or without problem on all nodes of cluster 110, then infrastructure deployer 106 may determine that the test version of the infrastructure software component should be rolled out to one or more additional clusters beyond cluster 110. In certain embodiments, the goal is to rollout the test version of the infrastructure software component to all nodes in all clusters. In yet another embodiment, the infrastructure deployer 106 may schedule a specific order in which a test version of the infrastructure software component is rolled out across subsets of nodes and across clusters, based on one or more of health information retrieved from the subsets of nodes and feedback from users receiving requested resources via the subsets of nodes.

In an embodiment, the signals collected from nodes 126A-126N by health monitor 206 may comprise a highly diverse set of signals collected from a variety of components within each of nodes 126A-126N, such that the collected signals provide a comprehensive basis for detecting any issues caused by a bad rollout. In an embodiment, the set of signals that are collected may be optimized through observation and analysis (human or automated) to ensure that such signals have low noise, and to help ensure that false positives do not block deployments randomly.

Figure 3:
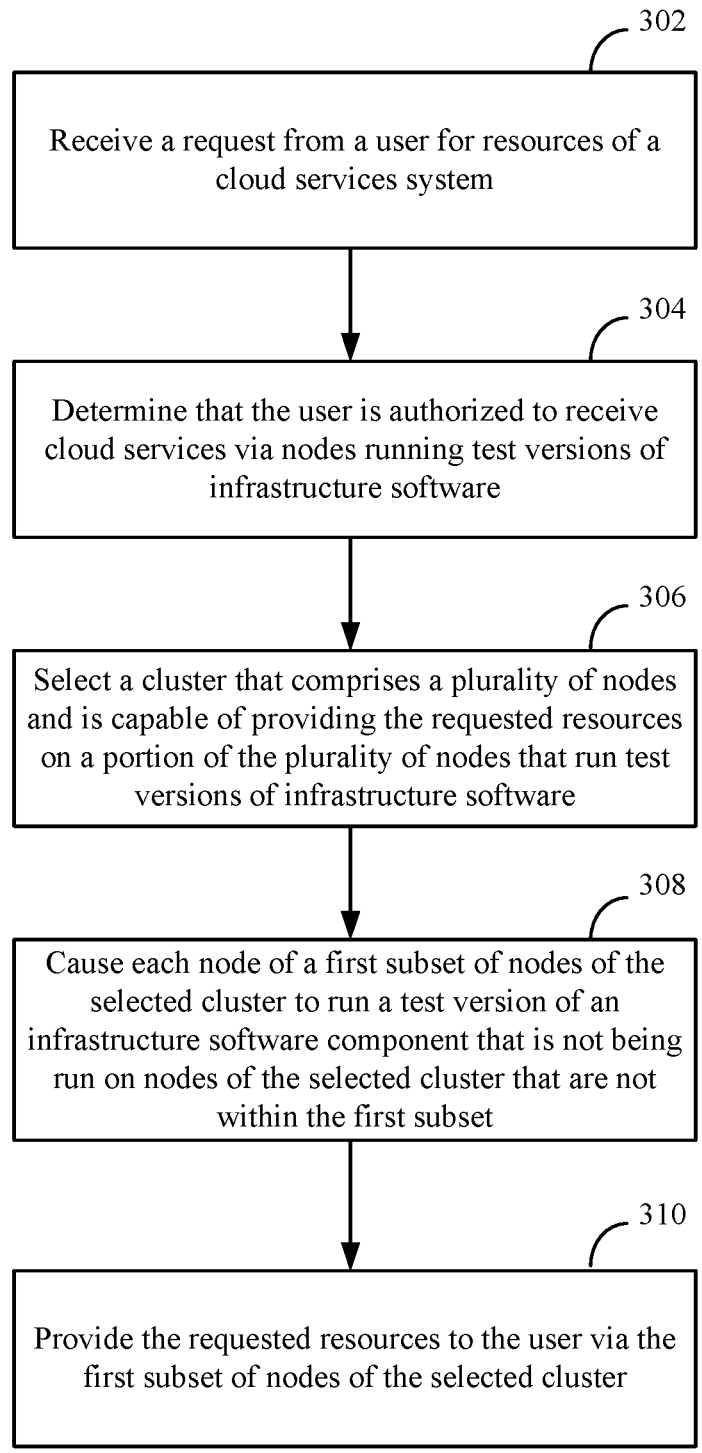
FIG. 3 depicts a flowchart of a method for partitioning and orchestrating infrastructure software deployments in a cloud services system to help achieve the safe rollout of infrastructure software, in accordance with an embodiment.

Various flowcharts will now be described to further clarify and illustrate the foregoing techniques and embodiments. For example, FIG. 3 depicts a flowchart 300 of a method for partitioning and orchestrating infrastructure software deployments in a cloud services system to help achieve the safe rollout of infrastructure software, in accordance with an embodiment. The method of flowchart 300 may be performed, for example, by various components of cloud services system 100 as described above in reference to FIG. 1. However, the method is not limited to that embodiment and persons skilled in the art will understand the method of flowchart 300 could be implemented by other systems or components.

As shown in FIG. 3, the method of flowchart 300 begins at step 302 in which a request is received from a user for resources of a cloud services system. For example, and with continued reference to FIG. 1, interface 102 may receive from a user a request for resources of cloud services system 100.

At step, 304, it is determined that the user is authorized to receive cloud services via nodes running test versions of infrastructure software. For example, and with continued reference to FIG. 1, resource provider 104 may determine that the user is authorized to receive cloud services via nodes running test versions of infrastructure software.

At step, 306, a cluster that comprises a plurality of nodes and is capable of providing the requested resources on a portion of the plurality of nodes that run test versions of infrastructure software is selected. For example, and with continued reference to FIG. 1, resource provider 104 may select cluster 110 that comprises a plurality of nodes 126A-126N and is capable of providing the requested resources on a portion of the plurality of nodes (e.g., slice 118 or slice 120) that are running test versions of infrastructure software. As another example, resource provider 104 may select a cluster 112 that comprises a plurality of nodes 128A-128N and is capable of providing the requested resources on a portion of the plurality of nodes (e.g., slice 122 or slice 124) that are running test versions of infrastructure software. As was previously noted, the selection of the cluster may take into account certain user preferences such as geographic location, specific hardware and/or software configuration preferences, or preferences to deploy resources onto a slice with a specific alias.

At step, 308, each node of a first subset of nodes in the selected cluster is caused to run a test version of an infrastructure software component that is not being run on nodes of the selected cluster that are not within the first subset. For example, and with continued reference to FIG. 1, if the selected cluster is cluster 110, cluster management unit 114 may cause each node of a first subset of nodes (e.g., slice 118 or slice 120) within cluster 110 to run a test version of an infrastructure software component that is not being run on nodes of cluster 110 that are not within the first subset. As another example, if the selected cluster is cluster 112, cluster management unit 116 may cause each node of a first subset of nodes (e.g., slice 122 or slice 124) of cluster 112 to run a test version of an infrastructure software component that is not being run on nodes of cluster 112 that are not within the first subset.

At step 310, the requested resources are provided to the user via the first subset of nodes of the selected cluster. For example, and with continued reference to FIG. 1, if the selected cluster is cluster 110, cluster management unit 114 may provide the requested resources to the user via slice 118 or slice 120 of cluster 110 upon which the test version of the infrastructure software component is being run. As another example, if the selected cluster is cluster 112, cluster management unit 116 may provide the requested resources to the user via slice 122 or slice 124 upon which the test version of the infrastructure software component is being run.

Figure 4:
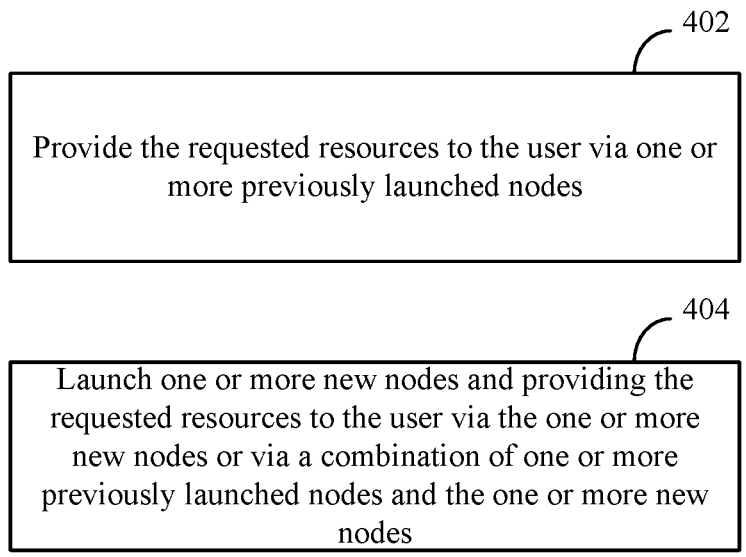
FIG. 4 depicts various steps by which a cluster management unit may provide requested resources to a user via one or more nodes that run a test version of an infrastructure software component, in accordance with an embodiment.

FIG. 4 depicts various steps by which a cluster management unit may provide requested resources to a user via one or more nodes that run a test version of an infrastructure software component, in accordance with an embodiment. Each step shown in FIG. 4 may represent one method for performing steps 308 and 310 of flowchart 300. Each step shown in FIG. 4 may be performed, for example, by cluster management unit 114 or cluster management unit 116 as described above in reference to FIG. 1. However, FIG. 4 is not limited to that embodiment and persons skilled in the art will understand that the steps shown in FIG. 4 could be implemented by other systems or components.

As shown in FIG. 4, in a step 402, the requested resources are provided to the user via one or more previously launched nodes. For example, if cluster management unit 114 determines that slice 118 should be used to provide the requested resources and that previously launched node 126A of slice 118 has the capacity to provide the requested resources, cluster management unit 114 may provide the requested resources to the user via node 126A of slice 118.

As further shown in FIG. 4, in a step 404, one or more new nodes are launched (i.e., starting the test version of infrastructure software for the specific slice as determined by infrastructure deployer 106) and the requested resources are provided to the user via the one or more new nodes or via a combination of one or more previously launched nodes and the one or more new nodes. For example, if cluster management unit 114 determines that slice 118 should be used to provide the requested resources and that previously launched node 126A of slice 118 does not have sufficient capacity to provide the requested resources and/or does not satisfy all user-provided preferences, cluster management unit 114 may launch one or more new nodes within slice 118 that together with node 126A may be used to provide the requested resources to the user.

Figure 5:
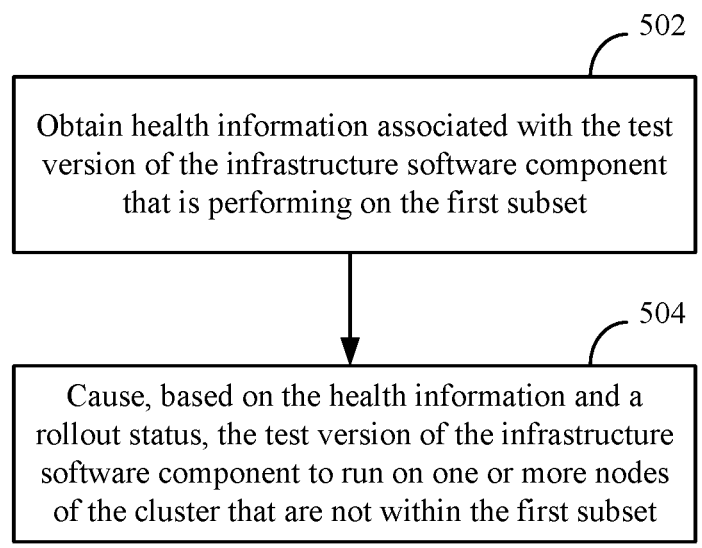
FIG. 5 depicts a flowchart of a method by which a cloud services system causes a test version of an infrastructure software component running on a subset of nodes of a cluster to be rolled out to remaining nodes in the cluster, in accordance with an embodiment.

FIG. 5 depicts a flowchart 500 of a method by which a cloud services system causes a test version of an infrastructure software component running on a subset of nodes of a cluster to be rolled out to the remaining nodes in the cluster, in accordance with an embodiment. The steps of flowchart 500 may be performed, for example, subsequent to the steps of flowchart 300. The method of flowchart 500 may be performed, for example, by various components of cloud service system 100 as described above in reference to FIGS. 1 and 2. However, the method is not limited to that embodiment and persons skilled in the art will understand that the method of flowchart 500 could be implemented by other systems or components.

As shown in FIG. 5, the method of flowchart 500 begins at step 502 in which health information associated with the test version of the infrastructure software component that is performing on the first subset is obtained. For example, and with continued reference to FIGS. 1 and 2, infrastructure deployer 106 may obtain from health monitor 206 health information associated with a test version of infrastructure software that is running on a slice (slice 118 or slice 120) of nodes within cluster 110. Health information may also be collected from users whose resources run on a slice (slice 118 or slice 120) of nodes within cluster 110.

At step, 504, based on the health information and a rollout status, the test version of the infrastructure software component is caused to run on one or more nodes of the cluster that are not within the first subset. For example, and with continued reference to FIGS. 1 and 2, based on the health information and the rollout status, infrastructure deployer 106 may cause node manager 204 of cluster management unit 114 to run the test version of the infrastructure software component on one or more nodes of cluster 110 that are not within the first subset (e.g., not within slice 118 or 120). For example, based on the health information, infrastructure deployer 106 may cause node manager 204 to run the test version of the infrastructure software component on all the other nodes of cluster 110 that are not within the first subset (e.g., not within slice 118 or slice 120). This process may not happen instantaneously and may be implemented progressively (e.g., one-at-a-time or in batches), and health validation may occur at any point in the process. In accordance with further embodiments (not represented in FIG. 5), if infrastructure deployer 106 determines, based on the health information and the rollout status, that there are problems with the test version of the infrastructure software component, infrastructure deployer 106 may take various actions including but not limited to: rolling back the test version of the infrastructure software component within the slice in which it is running to a last known successfully deployed version, stopping further propagation of the test version of the infrastructure software component to other nodes in cluster 110, and/or stopping further propagation of the test version of the infrastructure software component to other clusters.

Figure 6:
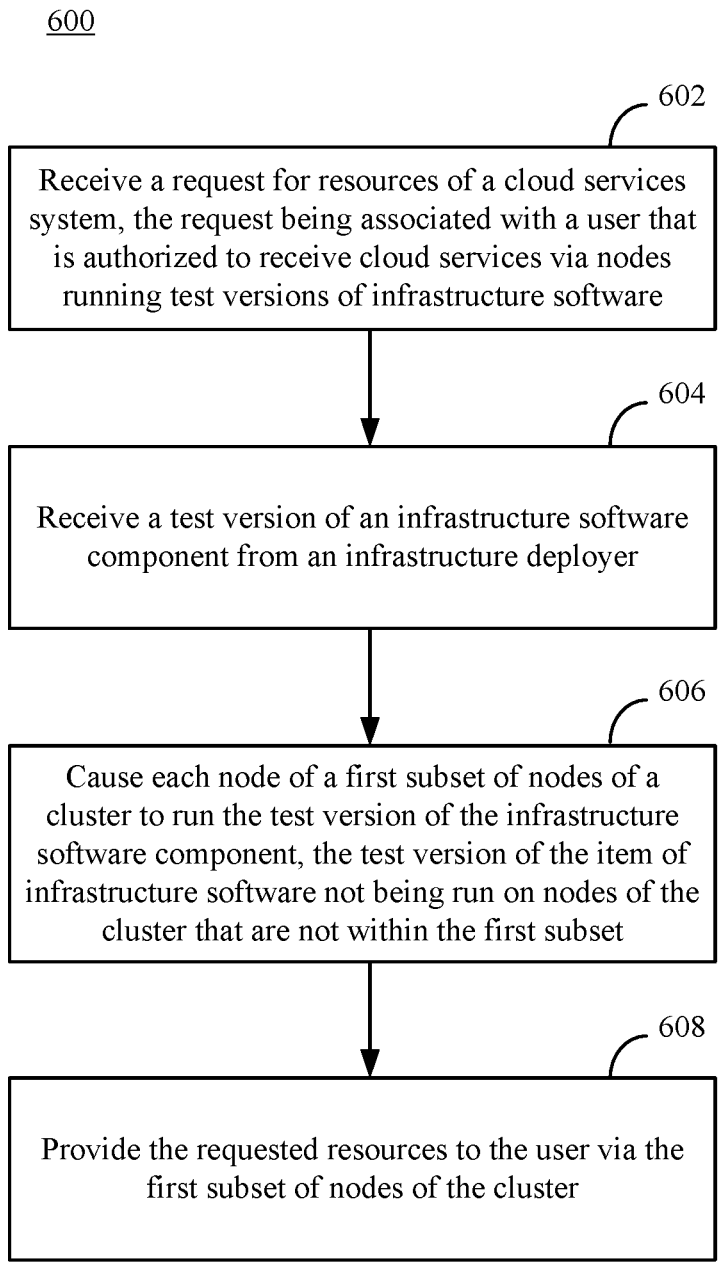
FIG. 6 depicts a flowchart of a method by which a cluster management unit partitions infrastructure software deployments to help achieve a safe rollout of infrastructure software in a cloud services system, in accordance with an embodiment.

FIG. 6 depicts a flowchart 600 of a method by which a cluster management unit partitions infrastructure software deployments to help achieve a safe rollout of infrastructure software in a cloud services system, in accordance with an embodiment. The method of flowchart 600 may be performed, for example, by various components of cluster management unit 114 as described above in reference to FIG. 2. However, the method is not limited to that embodiment and persons skilled in the art will understand the method of flowchart 600 could be implemented by other systems or components.

As shown in FIG. 6, the method of flowchart 600 begins at step 602 in which a request for resources of a cloud services system is received, the request being associated with a user that is authorized to receive cloud services via nodes running test versions of infrastructure software. For example, and with continued reference to FIG. 2, request receiver 202 may receive a request for resources of cloud services system 100 from interface 102, the request being associated with a user that is authorized to receive cloud services via nodes running test versions of infrastructure software.

At step 604, a test version of an infrastructure software component is received from an infrastructure deployer. For example, and with continued reference to FIG. 2, node manager 204 may receive a test version of an infrastructure software component from infrastructure deployer 106 via infrastructure deployer interface 208.

At step, 608, each node of a first subset of nodes of a cluster is caused to run the test version of the infrastructure software component, the test version of the infrastructure software component not being run on nodes of the cluster that are not within the first subset. For example, and with continued reference to FIG. 2, node manager 204 may cause node 126A of slice 118 to run the test version of the infrastructure software component, wherein the test version of the infrastructure software component is not being run on nodes 126B-126N that are not within slice 118.

At step, 608, the requested resources are provided to the user via the first subset of nodes of the cluster. For example, and with continued reference to FIG. 2, node manager 204 may provide the requested resources to the user via slice 118 of cluster 110 that is running the test version of the infrastructure software component.

Figure 7:
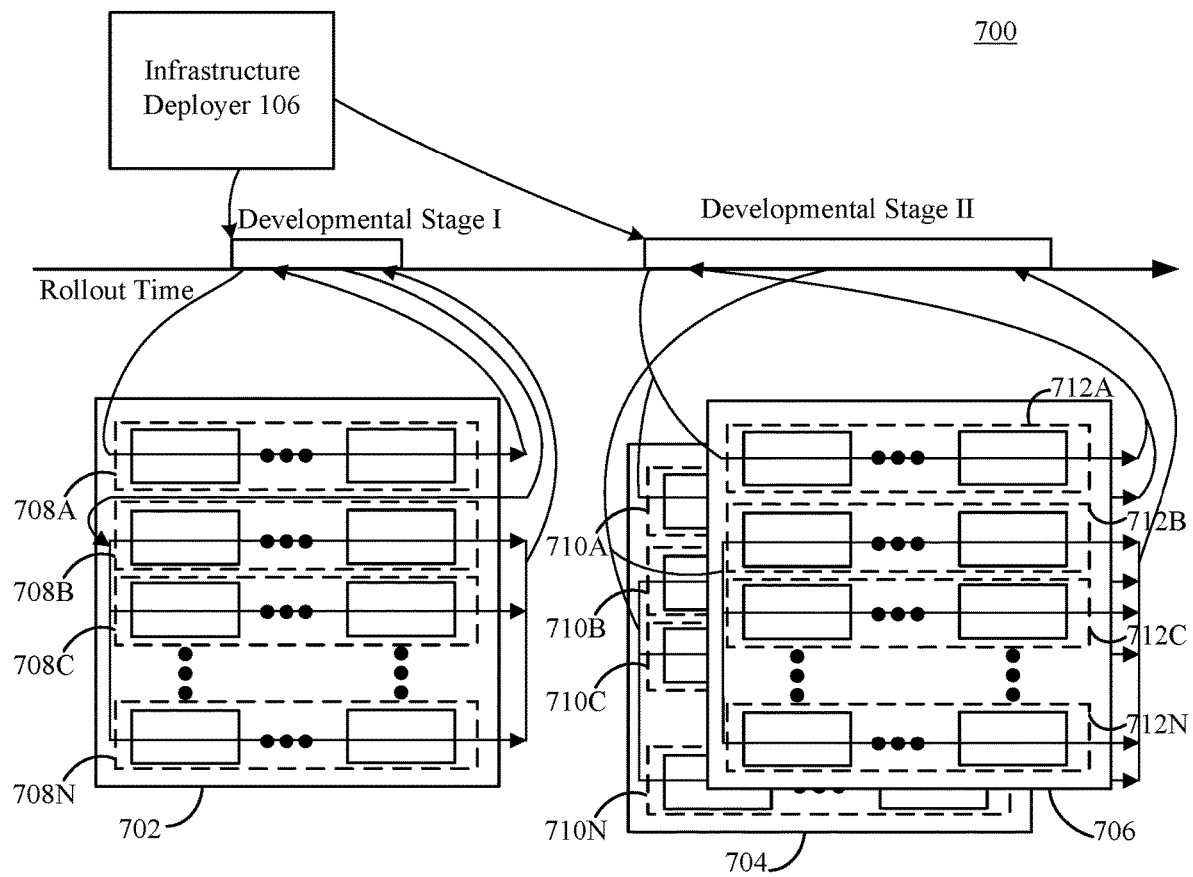
FIG. 7 illustrates an example process by which a broad rollout of infrastructure software is achieved, in accordance with an embodiment.

FIG. 7 illustrates an example process by which a broad rollout of infrastructure software is achieved. In particular, FIG. 7 depicts the rollout of infrastructure software to a first cluster 702 during a first developmental stage and to a second cluster 704 and a third cluster 706 during a second developmental stage. Clusters 702, 704, and 706 include several slices of nodes (depicted as rows for the sake of illustration). For example, cluster 702 includes slices 708A, 708B, 708C, . . . 708N; cluster 704 includes slices 710A, 710B, 710C, . . . 710N; and cluster 706 includes slices 712A, 712B, 712C, . . . 712N. Each slice may include one or more nodes. In one embodiment, each of clusters 702, 704 and 706 may be located at a different datacenter. Alternatively, one or more of clusters 702, 704 and 706 may be located at the same datacenter. In a still further embodiment, cluster 702 may comprise a test cluster, while clusters 704 and 706 may comprise production clusters. In yet another embodiment, the one or more nodes of clusters 702, 704, and 706 may have at least one different hardware configuration and/or software configuration characteristic from each other.

As shown in FIG. 7, during the first developmental stage, infrastructure deployer 106 is initially triggered to provide a test version of an infrastructure software component to slice 708A within cluster 702, where such test version is executed. After determining that the test version of the infrastructure software component is running acceptably or without problem within slice 708A, infrastructure deployer 106 may provide the test version of the infrastructure software component for execution within all the other slices within cluster 702 (including slices 708B, 708C, . . . 708N). The steps that infrastructure deployer 106 follows to deploy infrastructure software to an increasingly larger number of nodes can follow any ordering, scheduling policy, and/or criteria deemed fit by the cloud services provider, and the specific rollout steps mentioned here are merely examples of one such process. For example, infrastructure deployer 106 can implement additional logic/criteria for determining the exact time schedule and order of updating subsequent slices and updates to different slices can take place concurrently within each cluster and among different clusters.

During the second developmental stage, after determining that the test version of infrastructure software is running acceptably or without problem within all of the slices within cluster 702, infrastructure deployer 106 provides the test version of infrastructure software to slice 710A of cluster 704 and slice 712A of cluster 706, where such test version is executed. After determining that the test version of infrastructure software is running acceptably or without problem within slices 710A and 712A, infrastructure deployer 106 may provide the test version of infrastructure software to the test version of the infrastructure software component for execution within all the other slices within cluster 704 (including slices 710B, 710C, . . . 710N) and within cluster 706 (including slices 712B, 712C, . . . 712N). The process depicted in FIG. 7 increases the safety of rollouts of test versions of infrastructure software by enabling the containment of issues with test versions of infrastructure software to a subset of nodes.

Figure 8:
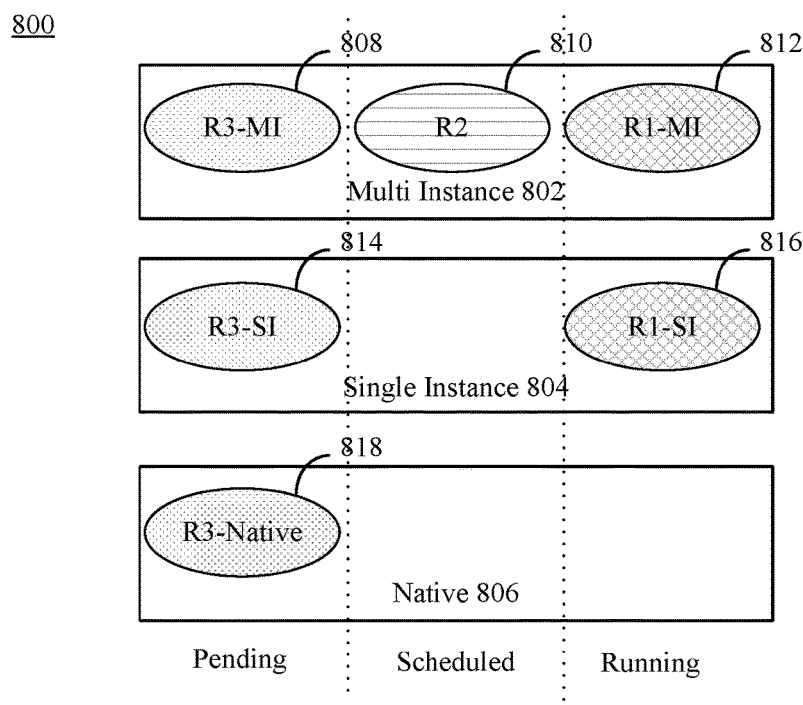
FIG. 8 illustrates an example process by which multiple test versions of different infrastructure software components can be concurrently rolled out to different subsets of nodes within a cluster, in accordance with an embodiment.

FIG. 8 is an illustration 800 of an example process by which multiple test versions of different items of infrastructure software can be concurrently rolled out to different subsets of nodes within a cluster, in accordance with an embodiment.

In certain conventional cloud services systems, only one rollout of a test version of an infrastructure software component may be scheduled for a cluster at any given time. Since there may be multiple types of nodes which need to be updated, the restriction of one rollout at a time may prevent parallel updates on nodes that are within the same cluster but belong to different categories of cloud services offerings (e.g., native, single-instance, multi-instance etc.) For example, if a multi-instance rollout is ongoing within a particular cluster, a single-instance rollout may have to wait.

Embodiments described herein address this problem by allowing multiple concurrent rollouts within the same cluster by splitting the rollout to launch on different subsets of nodes within the cluster, which are referred to herein as slices. In one embodiment, slices may be defined based on node slice alias (e.g., native, single-instance, multi-instance etc.). For example, referencing FIG. 8, slice 802 is of slice alias multi instance, slice 804 is of single instance slice alias, and slice 806 is of slice alias native. In this example, these slices may be running production versions of infrastructure software which were previously validated as test versions of infrastructure software using the process depicted in FIG. 7. Multi instance slice 802 is capable of servicing user requests requiring a same software instance at two or more nodes. For example, if the resource request is for a virtual machine, more than one virtual machine will be provided to the user at different nodes. This guarantees the availability of the resource to the user, for example, during node upgrade operations. On the other hand, single instance slice 802 is capable of servicing user requests requiring a single software instance. For example, if nodes of slice 802 are rebooted during upgrade operations, users with workloads executed on the nodes of slice 802 will lose availability. Native slice alias services user requests for resources including a physical machine.

For example, the diagram shown in FIG. 8 may be the result of the following rollout requests: At time t=0, rollout R1 is initiated with multi instance and single instance slice aliases. The rollout is split into R1-MI 812 and R1-SI 816. Since the slices at time t=0 are empty (i.e., there is no rollout in progress in that slice) and the rollout scheduling policy of the slices is to start immediately, R1-MI 812 and R1-SI 816 rollouts enter the running state on slices 702 and 704, respectively.

At time t=t1, rollout R2 is initiated with multi instance slice alias. Since the slice alias of R2 matches a given slice alias, R2 810 is queued up behind R1-MI 812 on slice 802. Since the rollout scheduling policy is start immediately, the rollout enters a scheduled state on slice 802.

At time t=t2, rollout R3 comes in with single instance, multiple instance, and native node slice aliases with a rollout scheduling policy to start at a specific time (e.g., after 2 days), for example. The rollout is split into R3-MI 808, R3-SI 814, R3-Native 818. R3-MI 808 is added to multi instance slice 802 scheduled behind R1-MI 812 and R2 810. R3-SI 814 is added to single instance slice 804 scheduled behind R1 SI 816. R3-Native 818 is added to native slice 806. R3-MI 808, R3-SI 814, and R3-Native 818 are in pending state as the rollout is supposed to start at a future date.

Although as discussed above in reference to FIG. 8, slices may be defined based on node slice alias (e.g., native, single-instance, multi-instance etc.), it is also noted that in embodiments a single slice may be defined to include nodes that provide multiple different categories of cloud services offerings (e.g., a combination of any of native, single-instance, multi-instance, etc.)

Further, as noted above, a user may elect to receive cloud services via nodes running test versions of infrastructure software. Similarly, the user may request a desired type of hardware or software capability. For example, the user may request a particular node slice alias. If the user request for resources includes a request for the single instance slice alias, a cluster management unit of a given cluster will provide the requested resources to the user via a subset of nodes of the cluster that are designated as the single instance slice alias. For example, if a user request for resources includes a request for single instance slice alias, the requested resources will be provided to the user via single instance slice 804.

III. Example Computer System Implementation

Figure 9:
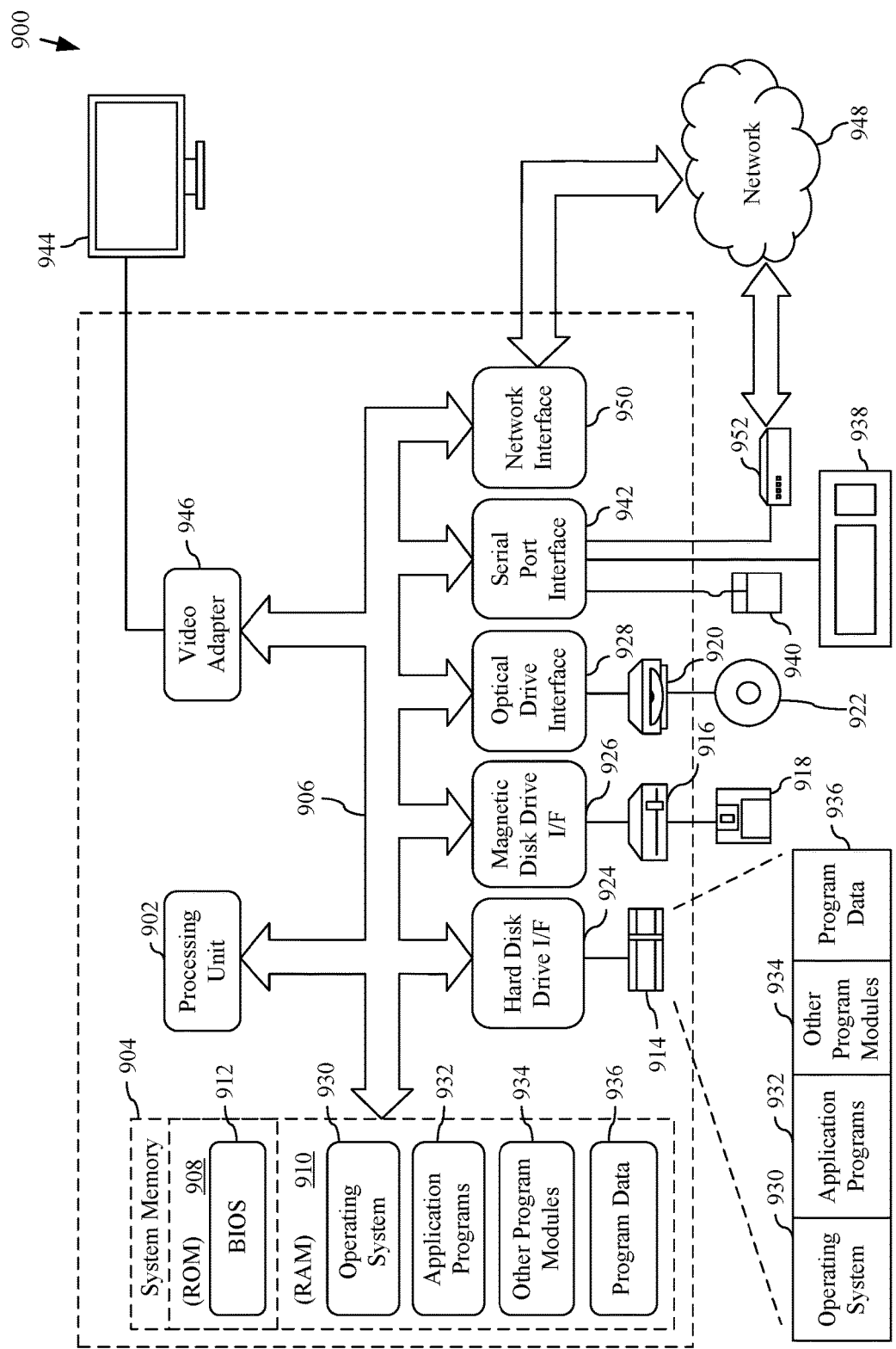
FIG. 9 is a block diagram of an example processor-based computer system that may be used to implement various embodiments.

FIG. 9 depicts an example processor-based computer system 900 that may be used to implement various embodiments described herein, such as any of the embodiments described in the Sections above and in reference to FIGS. 1-8. For example, processor-based computer system 900 may be used to implement any of the components of cloud services system 100 as described above in reference to FIGS. 1 and 2 as well as any of the flowcharts described above in reference to FIGS. 3-6. The description of system 900 provided herein is provided for purposes of illustration, and is not intended to be limiting. Embodiments may be implemented in further types of computer systems, as would be known to persons skilled in the relevant art(s).

As shown in FIG. 9, system 900 includes a processing unit 902, a system memory 904, and a bus 906 that couples various system components including system memory 904 to processing unit 902. Processing unit 902 may comprise one or more hardware-implemented microprocessors or microprocessor cores. Bus 906 represents one or more of any of several types of bus structures, including a memory bus or memory controller, a peripheral bus, an accelerated graphics port, and a processor or local bus using any of a variety of bus architectures. System memory 904 includes read only memory (ROM) 908 and random access memory (RAM) 910. A basic input/output system 912 (BIOS) is stored in ROM 908.

System 900 also has one or more of the following drives: a hard disk drive 914 for reading from and writing to a hard disk, a magnetic disk drive 916 for reading from or writing to a removable magnetic disk 918, and an optical disk drive 920 for reading from or writing to a removable optical disk 922 such as a CD ROM, DVD ROM, BLU-RAY™ disk or other optical media. Hard disk drive 914, magnetic disk drive 916, and optical disk drive 920 are connected to bus 906 by a hard disk drive interface 924, a magnetic disk drive interface 926, and an optical drive interface 928, respectively. The drives and their associated computer-readable media provide nonvolatile storage of computer-readable instructions, data structures, program modules and other data for the computer. Although a hard disk, a removable magnetic disk and a removable optical disk are described, other types of computer-readable memory devices and storage structures can be used to store data, such as solid state drives (SSDs), flash memory cards, digital video disks, random access memories (RAMs), read only memories (ROM), and the like.

A number of program modules may be stored on the hard disk, magnetic disk, optical disk, ROM, or RAM. These program modules include an operating system 930, one or more application programs 932, other program modules 934, and program data 936. In accordance with various embodiments, the program modules may include computer program logic that is executable by processing unit 902 to implement any of the embodiments described in the Sections above and in reference to FIGS. 1-8. For example, the program modules may include computer program logic that is executable by processing unit 902 to implement any of the components of cloud services system 100 as described above in reference to FIGS. 1 and 2 as well as any of the flowcharts described above in reference to FIGS. 3-6.

A user may enter commands and information into system 900 through input devices such as a keyboard 938 and a pointing device 940 (e.g., a mouse). Other input devices (not shown) may include a microphone, joystick, game controller, scanner, or the like. In one embodiment, a touch screen is provided in conjunction with a display 944 to allow a user to provide user input via the application of a touch (as by a finger or stylus for example) to one or more points on the touch screen. These and other input devices are often connected to processing unit 902 through a serial port interface 942 that is coupled to bus 906, but may be connected by other interfaces, such as a parallel port, game port, or a universal serial bus (USB). Such interfaces may be wired or wireless interfaces.

Display 944 is connected to bus 906 via an interface, such as a video adapter 946. In addition to display 944, system 900 may include other peripheral output devices (not shown) such as speakers and printers.

System 900 is connected to a network 948 (e.g., a local area network or wide area network such as the Internet) through a network interface 950, a modem 952, or other suitable means for establishing communications over the network. Modem 952, which may be internal or external, is connected to bus 906 via serial port interface 942. System 900 may include multiple network interfaces.

As used herein, the terms "computer program medium," "computer-readable medium," and "computer-readable storage medium" are used to generally refer to memory devices or storage structures such as the hard disk associated with hard disk drive 914, removable magnetic disk 918, removable optical disk 922, as well as other memory devices or storage structures such as flash memory cards, digital video disks, random access memories (RAMs), read only memories (ROM), and the like. Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media. Embodiments are also directed to such communication media As noted above, computer programs and modules (including application programs 932 and other program modules 934) may be stored on the hard disk, magnetic disk, optical disk, ROM, or RAM. Such computer programs may also be received via network interface 950, serial port interface 942, or any other interface type. Such computer programs, when executed or loaded by an application, enable system 900 to implement features of embodiments discussed herein. Accordingly, such computer programs represent controllers of the system 900.

Embodiments are also directed to computer program products comprising software stored on any computer useable medium. Such software, when executed in one or more data processing devices, causes a data processing device(s) to operate as described herein. Embodiments may employ any computer-useable or computer-readable medium, known now or in the future. Examples of computer-readable mediums include, but are not limited to memory devices and storage structures such as RAM, hard drives, floppy disks, CD ROMs, DVD ROMs, zip disks, tapes, magnetic storage devices, optical storage devices, MEMs, nanotechnology-based storage devices, and the like.

IV. Additional Example Embodiments

In an embodiment, a system comprises: an interface executing on at least one of one or more computers, the interface being configured to receive from a user a request for resources of a cloud services system; a resource provider executing on at least one of the one or more computers, the resource provider being configured to determine that the user is authorized to receive cloud services via nodes running test versions of infrastructure software, to select a cluster that comprises a plurality of nodes and is capable of providing the requested resources on a portion of the plurality of nodes that run test versions of infrastructure software, and to dispatch the request to a cluster management unit associated with the selected cluster; the cluster management unit executing on at least one of the one or more computers, the cluster management unit being configured to provide the requested resources to the user via a first subset of nodes of the selected cluster, the cluster management unit being further configured to cause each node of the first subset to run a test version of an infrastructure software component that is not being run on nodes of the cluster that are not within the first subset; and an infrastructure deployer executing on at least one of the one or more computers, the infrastructure deployer being configured to provide the test version of the infrastructure software component to the cluster management unit.

In an embodiment of the foregoing system, the interface comprises one of: a Web portal; a command line interface; a graphical user interface; or an application programming interface (API).

In an embodiment of the foregoing system, the resource provider is further configured to determine that the user is authorized to receive cloud services via nodes running test versions of infrastructure software based on information included in the request.

In an embodiment of the foregoing system, the resource provider is further configured to determine that the user is authorized to receive cloud services via nodes running test versions of infrastructure software by determining that the user is included in a registry of users that are authorized to receive cloud services via nodes running test versions of infrastructure software.

In an embodiment of the foregoing system, the cluster management unit is further configured to provide the requested resources to the user via the first subset of nodes of the selected cluster by: providing the requested resources to the user via one or more previously launched nodes; or launching one or more new nodes and providing the requested resources to the user via the one or more new nodes or via a combination of one or more previously launched nodes and the one or more new nodes.

In an embodiment of the foregoing system, the cluster management unit is further configured to provide health information associated with the test version of the infrastructure software component to the infrastructure deployer, and the infrastructure deployer is further configured, based on the health information and a rollout status, to notify the cluster management unit to roll out the test version of the infrastructure software component to one or more nodes of the cluster that are not within the first subset.

In an embodiment of the foregoing system, the infrastructure deployer is further configured to schedule a specific order in which the test version of the infrastructure software component is rolled out across subsets of nodes and across clusters, based on one or more of health information retrieved from the subsets of nodes, feedback from users receiving requested resources via the subsets of nodes, and promotion of the test version of the infrastructure software for a broader rollout.

In an embodiment of the foregoing system, the infrastructure deployer is further configured to provide another test version of another infrastructure software component to the cluster management unit, and the cluster management unit is further configured to cause each node of a second subset of nodes of the selected cluster to run the other test version of the other infrastructure software component, wherein the second subset is non-overlapping with respect to the first subset.

In an embodiment of the foregoing system, the infrastructure deployer is further configured to provide the test version of the infrastructure software component to a second cluster management unit to roll out in a subset of nodes of a second selected cluster, the subset of nodes of the second selected cluster running the test version of the infrastructure software component in parallel with the first subset of nodes.

In another embodiment, a method comprises: receiving a request from a user for resources of a cloud services system; determining that the user is authorized to receive cloud services via nodes running test versions of infrastructure software; selecting a cluster that comprises a plurality of nodes and is capable of providing the requested resources on a portion of the plurality of nodes that run test versions of infrastructure software; causing each node of a first subset of the nodes within the selected cluster to run a test version of an infrastructure software component, the test version of the infrastructure software component not being run on nodes of the cluster that are not within the first subset; and providing the requested resources to the user via the first subset of nodes of the selected cluster. In an embodiment of the foregoing method, the determining that the user is authorized to receive cloud services via nodes running test versions of infrastructure software comprises: determining that the user is authorized to receive cloud services via nodes running test versions of infrastructure software based on information included in the request; or determining that the user is in a registry of users that are authorized to receive cloud services via nodes running test versions of infrastructure software.

In an embodiment of the foregoing method, the method further comprises providing the requested resources to the user via the first subset of nodes of the selected cluster by one or more of: providing the requested resources to the user via one or more previously launched nodes; and launching one or more new nodes and providing the requested resources to the user via the one or more new nodes or via a combination of one or more previously launched nodes and the one or more new nodes.

In an embodiment of the foregoing method, the method further comprises: obtaining health information associated with the test version of the infrastructure software component that is performing on the first subset; and causing, based on the health information and a rollout status, the test version of the infrastructure software component to run on one or more nodes of the cluster that are not within the first subset.

In an embodiment of the foregoing method, the method further comprises causing each node of a second subset of nodes of the selected cluster to run another test version of another infrastructure software component, wherein the second subset is non-overlapping with respect to the first subset.

In an embodiment of the foregoing method, the method further comprises causing each node of a subset of nodes of a second selected cluster to run the test version of the infrastructure software component.

In another embodiment, a cluster management unit, executing on one or more computers, comprises: a request receiver that is configured to receive a request for resources of a cloud services system, the request being associated with a user that is authorized to receive cloud services via nodes running test versions of infrastructure software; a node manager that is configured to provide the requested resources to the user via a first subset of nodes of a cluster that is managed by the cluster management unit and that is configured to cause each node of the first subset to run a test version of an infrastructure software component that is not being run on nodes of the cluster that are not within the first subset; and an infrastructure deployer interface that is configured to receive the test version of the infrastructure software component from an infrastructure deployer.

In an embodiment of the foregoing cluster management unit, the node manager is further configured to provide the requested resources to the user via the first subset of nodes of the cluster by providing the requested resources to the user via: one or more previously launched nodes; one or more new nodes; or a combination of one or more previously launched nodes and one or more new nodes.

In an embodiment of the foregoing cluster management unit, the cluster management unit further comprises: a health monitor configured to obtain health information associated with the test version of the infrastructure software component that is performing on the first subset and the infrastructure deployer interface is further configured to provide the health information to the infrastructure deployer.

In an embodiment of the foregoing cluster management unit, the infrastructure deployer interface is further configured to receive instructions from the infrastructure deployer to run the test version of the infrastructure software component on one or more nodes of the cluster that are not within the first subset.

In an embodiment of the foregoing cluster management unit, the infrastructure deployer interface is further configured to receive another test version of another infrastructure software component from the interface deployer and the node manager is further configured to cause each node of a second subset of nodes of the cluster to run the other test version of the other infrastructure software component, wherein the second subset is non-overlapping with respect to the first subset.

V. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A system, comprising:
an interface executing on at least one of one or more computers, the interface being configured to receive from a user a request for resources of a cloud services system;
a resource provider executing on at least one of the one or more computers, the resource provider being configured to determine that the user is authorized to receive cloud services via nodes running test versions of infrastructure software, the nodes comprising datacenter machines or virtual machines running on datacenter machines of the cloud services system, to select a cluster that comprises a plurality of nodes and is capable of providing the requested resources on a portion of the plurality of nodes that run test versions of infrastructure software, and to dispatch the request to a cluster management unit associated with the selected cluster, the selected cluster comprising an operationally-isolated group of commonly-managed computing devices;

the cluster management unit executing on at least one of the one or more computers, the cluster management unit being configured to provide the requested resources to the user via a first subset of nodes of the selected cluster, the cluster management unit being further configured to cause each node of the first subset to run a test version of an infrastructure software component that is not being run on nodes of the cluster that are not within the first subset; and an infrastructure deployer executing on at least one of the one or more computers, the infrastructure deployer being configured to provide the test version of the infrastructure software component to the cluster management unit.

2. The system of claim 1, wherein the interface comprises one of:
a Web portal;
a command line interface;
a graphical user interface; or
an application programming interface (API).

3. The system of claim 1, wherein the resource provider is configured to determine that the user is authorized to receive cloud services via nodes running test versions of infrastructure software based on information included in the request.

4. The system of claim 1, wherein the resource provider is configured to determine that the user is authorized to receive cloud services via nodes running test versions of infrastructure software by determining that the user is included in a registry of users that are authorized to receive cloud services via nodes running test versions of infrastructure software.

5. The system of claim 1, wherein the cluster management unit is further configured to provide the requested resources to the user via the first subset of nodes of the selected cluster by:
providing the requested resources to the user via one or more previously launched nodes; or
launching one or more new nodes and providing the requested resources to the user via the one or more new nodes or via a combination of one or more previously launched nodes and the one or more new nodes.

6. The system of claim 1, wherein:
the cluster management unit is further configured to provide health information associated with the test version of the infrastructure software component to the infrastructure deployer; and
the infrastructure deployer is further configured, based on the health information and a rollout status, to notify the cluster management unit to roll out the test version of the infrastructure software component to one or more nodes of the cluster that are not within the first subset.

7. The system of claim 1, wherein the infrastructure deployer is further configured to schedule a specific order in which the test version of the infrastructure software component is rolled out across subsets of nodes and across clusters, based on one or more of health information retrieved from the subsets of nodes, feedback from users receiving requested resources via the subsets of nodes, and promotion of the test version of the infrastructure software for a broader rollout.

8. The system of claim 1, wherein:
the infrastructure deployer is further configured to provide another test version of another infrastructure software component to the cluster management unit; and
the cluster management unit is further configured to cause each node of a second subset of nodes of the selected cluster to run the other test version of the other infrastructure software component, wherein the second subset is non-overlapping with respect to the first subset.

9. The system of claim 1, wherein the infrastructure deployer is further configured to provide the test version of the infrastructure software component to a second cluster management unit to roll out in a subset of nodes of a second selected cluster, the subset of nodes of the second selected cluster running the test version of the infrastructure software component in parallel with the first subset of nodes.

10. A method, comprising:
receiving a request from a user for resources of a cloud services system;
determining that the user is authorized to receive cloud services via nodes running test versions of infrastructure software, the nodes comprising datacenter machines or virtual machines running on datacenter machines of the cloud services system;
selecting a cluster that comprises a plurality of nodes and is capable of providing the requested resources on a portion of the plurality of nodes that run test versions of infrastructure software, the selected cluster comprising an operationally-isolated group of commonly-managed computing devices;
causing each node of a first subset of the nodes within the selected cluster to run a test version of an infrastructure software component, the test version of the infrastructure software component not being run on nodes of the cluster that are not within the first subset; and
providing the requested resources to the user via the first subset of nodes of the selected cluster.

11. The method of claim 10, wherein determining that the user is authorized to receive cloud services via nodes running test versions of infrastructure software comprises:
determining that the user is authorized to receive cloud services via nodes running test versions of infrastructure software based on information included in the request; or
determining that the user is in a registry of users that are authorized to receive cloud services via nodes running test versions of infrastructure software.

12. The method of claim 10, further comprising providing the requested resources to the user via the first subset of nodes of the selected cluster by:
providing the requested resources to the user via one or more previously launched nodes; or
launching one or more new nodes and providing the requested resources to the user via the one or more new nodes or via a combination of one or more previously launched nodes and the one or more new nodes.

13. The method of claim 10, further comprising:
obtaining health information associated with the test version of the infrastructure software component that is performing on the first subset; and
causing, based on the health information and a rollout status, the test version of the infrastructure software component to run on one or more nodes of the cluster that are not within the first subset.

14. The method of claim 10, further comprising:
causing each node of a second subset of nodes of the selected cluster to run another test version of another infrastructure software component, wherein the second subset is non-overlapping with respect to the first subset.

15. The method of claim 10, further comprising:
causing each node of a subset of nodes of a second selected cluster to run the test version of the infrastructure software component.

16. A cluster management unit comprising:
one or more processing circuits;
one or more memory devices connected to the one or more processing circuits;
the one or more memory devices storing computer program logic for execution by the one or more processing circuits, the computer program logic comprising:
  a request receiver that is configured to receive a request for resources of a cloud services system, the request being associated with a user that is authorized to receive cloud services via nodes running test versions of infrastructure software, the nodes comprising datacenter machines or virtual machines running on datacenter machines of the cloud services system;
  a node manager that is configured to provide the requested resources to the user via a first subset of nodes of a cluster that is managed by the cluster management unit and that is configured to cause each node of the first subset to run a test version of an infrastructure software component that is not being run on nodes of the cluster that are not within the first subset, the cluster comprising an operationally-isolated group of commonly-managed computing devices; and
  an infrastructure deployer interface that is configured to receive the test version of the infrastructure software component from an infrastructure deployer.

17. The cluster management unit of claim 16, wherein the node manager is further configured to provide the requested resources to the user via the first subset of nodes of the cluster by providing the requested resources to the user via one or more of:
  one or more previously launched nodes; and
  one or more new nodes; or
  a combination of one or more previously launched nodes and one or more new nodes.

18. The cluster management unit of claim 16, wherein the computer program logic further comprises:
  a health monitor configured to obtain health information associated with the test version of the infrastructure software component that is performing on the first subset; and
  wherein the infrastructure deployer interface is further configured to provide the health information to the infrastructure deployer.

19. The cluster management unit of claim 16, wherein the infrastructure deployer interface is further configured to receive instructions from the infrastructure deployer to run the test version of the infrastructure software component on one or more nodes of the cluster that are not within the first subset.

20. The cluster management unit of claim 16, wherein the infrastructure deployer interface is configured to receive another test version of another infrastructure software component from the interface deployer; and
  wherein the node manager is further configured to cause each node of a second subset of nodes of the cluster to run the other test version of the other infrastructure software component, wherein the second subset is non-overlapping with respect to the first subset.

* * * * *